Everette M. Burdick
INVENTOR.

BY Hayden & Prandl

ATTORNEYS

United States Patent Office 3,274,073
Patented Sept. 20, 1966

3,274,073
METHOD FOR RECOVERING CHLOROPHYLLS
FROM PAPAYA PLANTS
Everette M. Burdick, 4821 Ronda St., Coral Gables, Fla.
Filed July 20, 1964, Ser. No. 383,890
24 Claims. (Cl. 195—2)

The present invention is a continuation-in-part of my prior copending application Serial No. 1,050, filed January 7, 1960, now United States Letters Patent No. 3,141,832.

The present invention relates to a novel method of recovering chlorophylls, and more particularly, to a method of recovering both oil soluble and water-soluble chlorophylls from papaya plants. The term papaya plants as used in the following specification and claims includes all of the species of papaya including by way of example: Carica papaya, Linn. family Caricaceae; Carica candamarcencis, Hook.; Carica dodecaphylla; Carica quercifolia, Solms.; Carica hastaefolia, Solms.; Carica gracilis, Solms.; Carica monoica; Carica cauliflora; Carica chrysopeala; Carica pentagona; Carica papaya, Gertn.; Vasconcellosia hastata, Caruel; and Apocynaceae.

Chloropyll is one of nature's most important compounds and a great amount of research and development has gone into not only basic investigations on its chemical structure and how it functions in green plants and algae, but also into its commercial production and utilization.

Broadly, the chlorophylls and chlorophyll derivatives can be classified in the self-explained catagories or groups as either oil soluble or water soluble, each of which find wide scale commercial use. Probably, the largest commercial use of the oil soluble chlorophylls and related derivatives is as a dyestuff. They are very effective in eliminating the mottling effect often seen in soaps and considerable amounts are used in shampoos and similar soap specialities. They are also quite effective in camouflage paints, synthetic films, and cloths although their stability under these conditions leaves much to be desired at present. The oil soluble chlorophylls are also used to standardize the green color of many foodstuffs such as olive oil.

The water-soluble chlorophyll derivatives find wide commercial use in many pharmaceuticals. They also have wide use in such specialities as chewing gums, deodorants, mouth washes, and throat lozenges, to list only some of the more important.

Industrial chlorophylls are usually extracted from dehydrated green leaf meals, such as alfalfa and various grasses because they are available commercially. Other sources that have been used from time to time, especially when they are available as waste by-products, include spinach, broccoli, kale, etc. All commercial methods involve an initial solvent extraction with a suitable hydrocarbon, such as hexane; various chlorinated solvents such as trichloroethylene or perchloroethylene; alcohols, such as methanol, ethanol, or isopropanol; ketones, such as acetone or methyl ethyl ketone; and various mixtures of these and other similar solvents. Many advantages have been claimed for so-called special solvent mixtures, but it is the nature of the chlorophyll source material that primarily determines the most suitable solvent. Economic factors and the final form of the chlorophyll or chlorophyll derivative also play important roles in the selection of the original extracting solvent. In any case, the original extracting solvent extracts not only the chlorophyll but also other materials such as fats, waxes, carotenoids, and other fat soluble substances.

It then becomes necessary to separate these materials from the desired chlorophylls, and the complexity of the mixture makes this a difficult task. Briefly, the commercial methods consist of well-known chromatographic techniques and well-known selective solvent separations. The latter technique has proven to be more economical on a commercial scale. Naturally, there are a great number of variations possible in both of these methods and need not be described herein.

Therefore, an object of the present invention is to provide a method for recovering chlorophylls which overcomes the problems of previous processes.

A still further object is to provide a method of recovering chlorophylls as by-products in the process of recovering proteolytic enzymes from papaya plants.

Still another object of the present invention is to provide a method of recovering chlorophylls which eliminates the problem of emulsion formation heretofore encountered.

Yet a further object of the present invention is to provide a method of incorporating metallic atoms in the central portion of the chylorophyll molecule in a water phase.

Still another object of the invention is to recover chlorophylls from papaya plant residue obtained as a by-product of proteolytic enzyme production, which residue is treated to render innocuous any enzymes that might be present which would interfere with recovery of the chlorophylls from the residue.

A further object of the invention is to provide a method of treating papaya plants for recovering chlorophylls therefrom.

Another object of the present invention is to provide a method of recovering oil and water-soluble chlorophylls from papaya plants without destroying or interfering with the recovery of other valuable constituents including carpaines, carotenoids, and proteolytic enzymes.

Other and further objects of the invention will become apparent from a consideration of the following description and drawings wherein.

Figure 1:
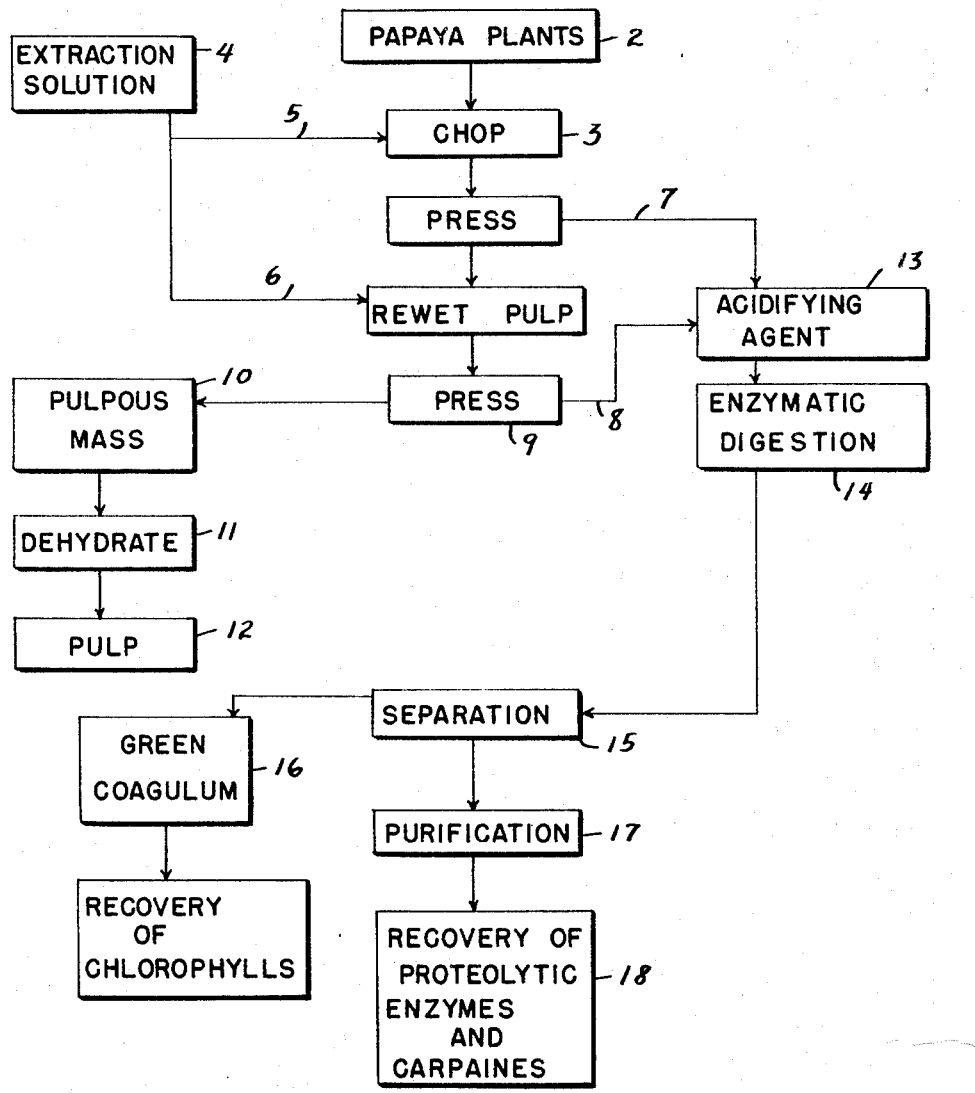
FIG. 1 is a schematic diagram illustrating a method of preparing and treating papaya plants to recover chlorophylls and proteolytic enzymes therefrom.

Attention is first directed to the flow diagram in FIG. 1 of the drawings.

A suitable method of growing or cultivating papaya plants is described in my copending application Serial No. 1,050 filed January 7, 1960, now U.S. Letters Patent No. 3,141,832, issued July 21, 1964. It can be appreciated that certain variations in the method of growing and cultivation can be utilized without affecting the results of the present invention.

When the plants are of a suitable height, such as, for example, about 2 to 3 feet tall, they may be harvested mechanically by a conventional forage harvester or by any suitable other means, and the plants may be cut a suitable height above the ground so that the roots may put out new tops, such as by way of example, anywhere from 9 to 12 inches above ground.

From the foregoing, it can be appreciated that the above procedure eliminates the necessity of collecting and drying only the papaya leaves for obtaining the carpaines therefrom. Also, such procedure enables not only the leaves but also the stems and trunks of the plant to be used for the production of carpaines, and it enables other valuable constituents to be recovered from the papaya plant.

As the plants are harvested, it may be advisable to spray the chopped plants with a suitable quantity of preserving solution; such preserving solution may comprise, by way of example, a mixture of ammonia, sulfites, and sulfides in the amount of 0.1% of each by weight. Where the preserving solution is used, the concentration may vary without departing from the scope of the invention but may be restricted by various economic factors. Preferably, the pH of the spraying solution is slightly alkaline or neutral, and a pH range of 7 to 9 is satisfactory.

It is not necessary or critical to the present invention to spray the plants as they are harvested, but the yield of valuable constituents obtained from the harvested or chopped plant may be reduced in some instances where the preserving solution is not utilized.

In addition, it should be further noted that the present process is quite suitable not only for recovering carpaines and other valuable constituents from green immature papaya plants, but the more mature or older papaya plants that have been raised primarily for fruit may also be used in practicing the present invention.

Attention is now directed to the schematic flow diagram, and it is to be noted that the harvested plants are represented generally by the numeral 2 and after harvesting may be chopped or macerated as represented by the numeral 3. Where the preserving solution is used, it may be employed by placing it on the papaya plants preferably soon after they are cut or as they are cut or harvested. After chopping the plants, they may be treated with a small quantity of extraction solution to prevent undesirable effects of oxidation and enzyme inactivation. Here again, this step may be eliminated without departing from the scope of this invention. The extraction solution may be added in any suitable manner, and it has been found that spraying the chopped plants with the extraction solution is quite satisfactory. Of course, the chopped plants could be dipped in the extraction solution, or the extraction solution may be applied in any one of several other ways.

Any alkaline enzyme protecting solution may be used as the extraction solution, and one which forms the function of a reducing or antioxidizing agent and a solubilizing or peptizing agent for aiding in the protection, liberation, and activation of the proteolytic enzymes is satisfactory. By way of example, some suitable reducing or antioxidizing agents which have been found suitable are are sulfites and bisulfites of sodium and potassium, sulfur dioxide, the sulfides and hydrosulfides of ammonium, sodium, and potassium, hydrogen sulfide, glutathionine, methionine, cysteine, thioglycolates, and cyanides. Out of this group, the sulfites and bisulfites of sodium and hydrosulfides of ammonium and sodium are preferred, but the others may be used if desired.

Where the enzymes are to be recovered from the same plants, then it is preferable to use or employ a papain-like enzyme activator, such as by way of example, the sulfites of sodium and potassium, the sulfides of sodium and potassium, the bisulfites of sodium and potassium, hydrosulfides and sulfides of ammonium, sodium, and potassium, certain metal chelating agents (versene, sequestrene) like diethylenetetra amino acetic acid and its soluble salts, hydrocyanic acid and its sodium and potassium salts. Among this group, the sulfides of sodium, the bisulfites of sodium, hydrosulfides of ammonium and diethylenetetra amino acetic acid and its soluble salts are preferred.

Among the solubilizing or peptizing agents, the following are desirable—chlorides of sodium and ammonium, phosphates of sodium and potassium, various meta- and polyphosphates of sodium and potassium, sodium citrate, hydrotropic agents such as sodium benzene sulfonate and sodium paracymene sulfonate. Among these, the chlorides of sodium and ammonium, polyphosphates of sodium, and sodium citrate are preferred. Also, sodium sulfite, the bisulfides and sulfides of ammonium and sodium, and ascorbic acid and its soluble salts are quite satisfactory. Generally, speaking, any dilute salt solution will function satisfactorily.

Concentration of the chemicals may be in the neighborhood of 0.1% by weight, and concentrations in the range of 0.1% to 0.25% by weight are satisfactory. Lower concentrations are generally ineffective, and higher concentrations are not necessary to accomplish the results.

After the chopped mass of green papaya plants has been thoroughly moistened, they are next treated to separate a liquor or liquid from the pulpous mass of the papaya plants; any suitable means may be used to separate the liquids from the pulp, such as by way of example, pressing. When pressing is employed, it may be accomplished by any suitable apparatus, such as a filter press or the like to separate the liquid from the pulp. Of course, the liquid may be extracted by any means, mechanical or chemical, which does not have deleterious effects on the desired constituents to be recovered.

It is desirable to rewet the pulpous mass with the extraction solution in order to extract more of the proteolytic enzymes and other constituents, and this may be done by adding to the wet pulp a volume of the extraction solution about equal to the volume of liquid obtained in the first pressing operation. The rewet pulp is then pressed as before to obtain a second portion of liquor and the resulting pulpous mass.

The pulpous mass may be dehydrated in a conventional dehydration kiln to make papaya pulp which can be used as an animal feedstuff which contains a good amount of protein and is quite rich in carotene or provitamin A. In the flow sheet, the extraction solution is illustrated at FIG. 1 by the numeral 4, and it can be seen that it is added as illustrated at 5 to the chopped papaya plants and is added as illustrated at 6 to the rewet pulp.

After the pressing to separate the liquid from the pulp, the pressings yield 75% to 90% of the total desired constituents. The liquids are combined as illustrated at 7 and 8 for subsequent processing. The pulpous mass obtained from the press 9 is represented at 10 and as noted above is dehydrated at 11 to produce the animal feedstuff represented by the numeral 12.

The two pressings of the plants yield 75% to 90% of the total desired constituents available from the plants, and while more rewettings and pressings give higher yields, the purification difficulties of the enzymes later in the process appear to be increased.

Of course, the number of rewettings and pressings may be varied as desired.

The combined liquors or liquids represented at 7 and 8 from the pressing may be green in color and may have a pH in the neighborhood of 8. At any event, regardless of the color and regardless of the pH, the pH of the liquid is adjusted to between 4.0 and 4.5 by the addition of an acidifying agent as represented by the numeral 13 in the drawing. The acidifying agent may be any suitable acid such as hydrochloric, sulfuric, citric, acitic, or phosphoric, by way of example only.

After the pH of the liquid has been adjusted, the liquid is digested preferably by carefully raising the temperature to approximately between 40° and 55° C. In this regard, it should be noted that any localized overheating of the liquid will tend to destroy the proteolytic enzyme activity. Papain, like all enzymes, is destroyed by heat, but at temperatures below 55° C., the rate of destruction is quite low while at higher temperatures the rate of destruction increases rapidly. The heating of the liquid effects enzymic digestion which liberates and otherwise activates the proteolytic enzymes and at the same time causes a coagulation of the protein impurities.

The enzymic digestion is continued until proper coagulation has been obtained, and I have determined that the time required to produce the desired results usually is between 10 and 30 minutes depending upon the particular papaya plants from which the liquids were obtained. In this regard, if the temperature of the liquid is raised carefully and uniformly, the coagulation will be effected at the lowest possible temperature thereby producing the most active papain from the plants.

The time of heating and the temperature of heating is not critical except that where heating is employed, it must be accomplished in a manner so as to not destroy the proteolytic enzyme activity as the coagulate is being formed. Generally speaking, it is undesirable to heat the liquid to more than 55° C. where it is desired to recover the papain. It can be appreciated that the heating can be carried out at temperatures below 40° C. and over an extended period of time, if desired, one of the primary limiting factors being that the liquid must be digested until a coagulate is formed.

Once the coagulate has been formed the coagulate can be separated from the liquid by any suitable means such as filtration, centrifugation, or simple settling. The formation of the coagulate may be termed a break which is clearly visible to the eye in that the liquid seems to curdle and separate into coagulum which may be green in color and a clear solution. If course, any suitable instrumental means may be used to determine the occurrence of this phenomenon.

Since the coagulate is mainly protein, it may be advisable to add some filter aid in this point in order to effect more rapid filtration and optimum clarification of the liquid. The clarified liquid can be further purified by treatment with activated carbons and/or filter aids to produce a relatively sparkling clear solution or liquid, which may then be concentrated from their 3% to 5% solids content to some 30% or 50% solids content by means of vacuum concentration. In this regard, it should be again noted that temperatures above 55° C. should be avoided to prevent loss in enzymic activity.

In the flow diagram, the enzymatic digestion is represented by the numeral 14 and the separation at 15. The coagulate illustrated at 16 is a rich source of chlorophylls, carotenes, xanthophylls, and protein, and the liquids are a good source of carpaines.

My copending applications Serial No. 383,891 and Serial No. 383,889 entitled, respectively, "Method for Recovering Carotenoids and Phytol From Papaya Plants" and "Method for Recovering Carpaines From Papaya Plants" describe and claim a process of recovering the carotenoids including xanthophylls from the green coagulum or coagulate and the carpaines from the liquids.

If desired, the protein may be separated from the coagulate 16 and added back to the papaya pulp feedstuff represented by the numeral 12. The generally clear or milky liquid separated from the coagulate is illustrated at 17 as being purified as noted above and concentrated as illustrated at 18 and as noted hereinabove.

Figure 2:
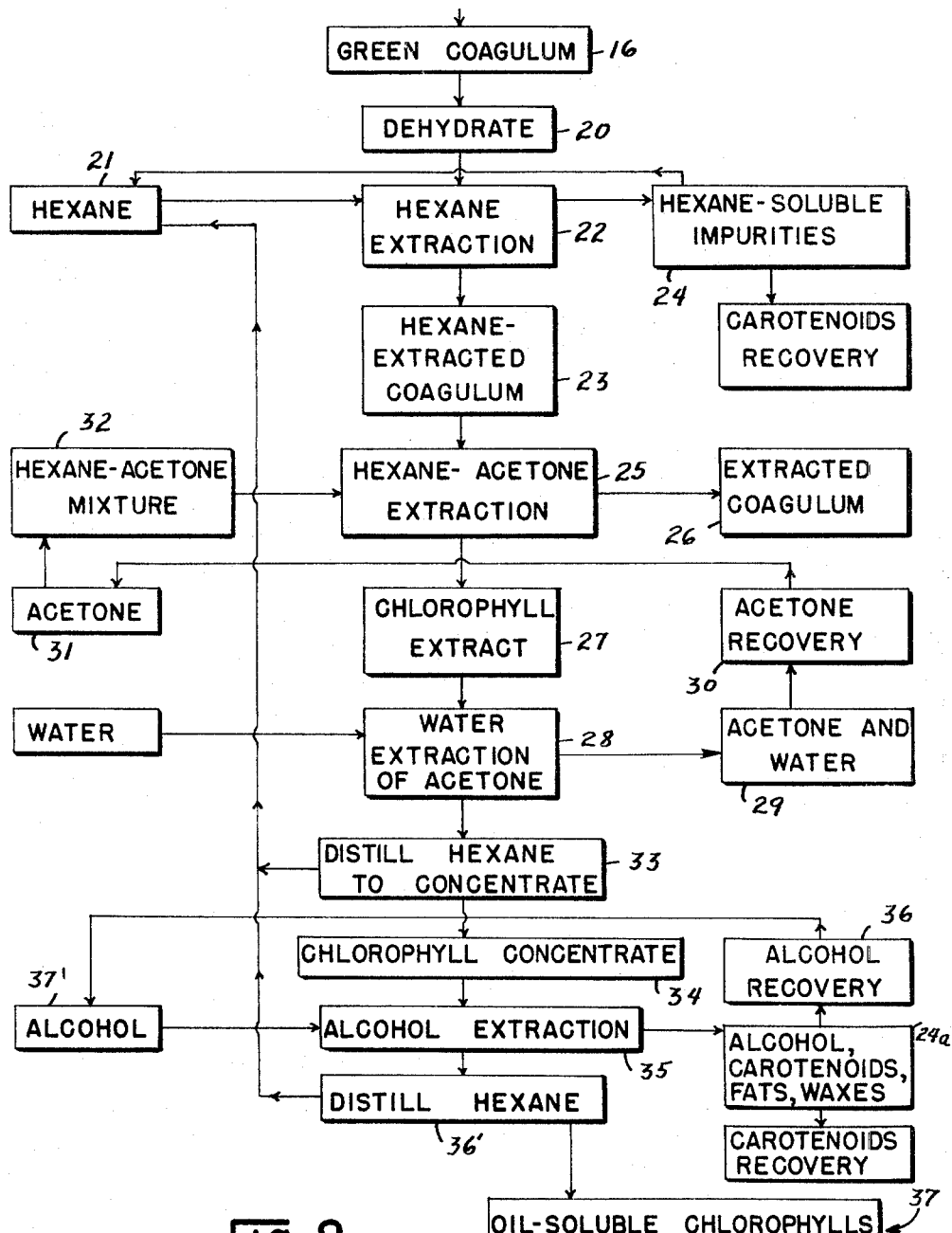
FIG. 2 is a schematic diagram illustrating a method of recovering oil soluble chlorophylls from papaya plants.

FIG. 2 is a flow diagram of the method of the present invention for recovering the oil soluble chlorophylls from the green coagulum separated from the enzymatic digestion above described. The pH of the green coagulum or coagulate is first of all raised from the range of 4.0 to 4.5 to between 7 and 10, preferably between 8 and 9 by the addition of alkaline substances. Almost any of the cheap nontoxic ones can be used, such as ammonium hydroxide, sodium hydroxide, potassium hydroxide, calcium hydroxide, sodium bicarbonate and sodium carbonate. Sodium carbonate is preferable primarily because it is quite effective and simple to use. This pH adjustment should be effected as soon as possible to reduce the destructive effects of the acid condition on the chlorophylls and other plant constituents present. If the green coagulum is to be maintained in a moist condition for any length of time, it should also be given a heat treatment or blanch to destroy the enzymes present, especially the remaining proteolytic enzymes and the chlorophyllase (chlorophyllase hydrolyzes phytol from the natural chlorophylls $a$ and $b$ to form the corresponding chlorophyllides $a$ and $b$). Temperatures in the range of 90° to 100° C. should be maintained for 1 to 5 minutes and should suffice to accomplish this result.

On the other hand, if the slightly alkaline green coagulum is to be dehydrated immediately by high temperature methods, such as by way of example, spray drying and drum drying, the heat treatment or blanch can be omitted. In any case, it is desirable to dehydrate the green coagulum as represented at 20 in FIG. 2 and grind it fine enough to permit easy extraction with petroleum ethers or naphthas having a narrow and low boiling range (because of the heat sensitivity of the materials being recovered), such as hexane (boiling range between 68° and 71° C.) and textile spirits (boiling range between 69° and 79° C.). Hexane from a source indicated at 21 is preferable primarily because of its commercial availability, high purity, low boiling range, and extracts almost no chlorophyll from well dehydrated plant materials. The hexane extraction step is represented at 22 of FIG. 2.

Colorless hexane of high purity is satisfactory for use in the hexane extraction step 22 to remove hexane soluble impurities, such as fats, oils, waxes, sterols, carotenoids, and other hexane soluble plant constituents. This extraction with hexane is continued preferably only as long as the extracts show that considerable yellow pigments are being removed. This portion represented at 24 from this step is subjected to distillation to recover the hexane which is returned to 21, and the remaining orange-yellow residue is then subjected to treatment to recover the carotenoids as described and claimed in my copending application Serial No. 383,891 filed July 20, 1964 for "Method of Recovering Carotenoids and Phytol From Papaya Plants."

The so-called hexane extracted coagulum represented at 23 is then subjected to a hexane acetone extraction 25 to recover practically all of the chlorophyll originally present in the green coagulum 16, that is 95% to 99%. This step results in a substantially, completely extracted coagulum represented at 26 that is grayish in color and a rich source of papaya plant protein and a chlorophyll liquid extract represented at 27 that is dark green in color and fluoresces a blood red in white light or sunlight. The extracting solution of hexane acetone mixture may vary in acetone content from 5% to 25% by volume, and about 10% by volume has been found quite satisfactory. Some carpaines can be recovered from the extracted coagulum 26 by means of a benzene extraction if its presence is objectionable for certain uses.

The chlorophyll extract 27 is next given a water extraction represented at 28 to remove or separate the acetone from the hexane as acetone plus water solution shown at 29. This acetone water solution 29 is fractionally distilled to recover the acetone for reuse. This step is represented at 30 in FIG. 2, and the acetone is conveyed to the acetone storage 31 for remixing with hexane at 32 supplied from supply 21 as shown in FIG. 2 for providing the hexane acetone mixture. The remaining hexane solution of chlorophyll is subjected to a distillation step 33 to concentrate and recover the hexane; this reduces the volume of the solution to between one-third and one-half of its original volume. The hexane recovered at 33 is conveyed back to supply 21 as shown in FIG. 2.

The resulting chlorophyll concentrate represented at 34 may then be extracted with an alcoholic solution such as by way of example, 90% methanol (10% water) as represented at 35 to remove the carotenoids, fats, waxes, and other methanol soluble impurities represented at 24a.

The separated phase 24a may be distilled to recover the alcohol (methanol in this example) for reuse as represented at 36, and the alcohol conveyed back to alcohol supply 37' as shown in FIG. 2. The alcoholic extraction step 35 is continued until the desired purity of chlorophyll has been achieved or until colorless extracts are obtained.

The material remaining after the step 35 is subjected to distillation represented at 36' to recover the hexane and return it to source 21, and the resulting product at 37 is a highly purified and concentrated oil soluble chlorophyll.

The following examples are given only by way of illustrating the foregoing process and are not intended to limit the scope of the present invention.

*Example 1*

Young papaya plants weighing 2000 grams were chopped and then treated to obtain a green coagulate or coagulum as described hereinabove.

The green coagulum was then made into a slurry by the addition of 100 ml. of water containing 0.25 gram of sodium carbonate to make it alkaline and rapidly heated to 95° C. with quite vigorous stirring, where it was held for two minutes before cooling by the application of a vacuum. The cooled mass was then completely dried in a vacuum oven or dehydrated. The dehydrated green coagulum containing some 40 grams of filter aid material weighed 62.4 grams. It was reduced to a fine powder by grinding and then mixing with 200 ml. of hexane and transferred into a suction filter. The filtrate was yellowish. The hexane extraction was continued by the slow addition of several small portions of hexane and when about 200 ml. had been added, the filtrate was showing a slight greenish color. The filtrates were combined and distilled to separate the hexane from the hexane soluble impurities.

The hexane extracted coagulum was made into a slurry by adding 200 ml. of hexane acetone mixture containing 90% hexane and 10% acetone by volume and thoroughly mixed. The filtrate or chlorophyll extract was separated by suction, as before, but it was dark green and was repeatedly passed over the filter cake to extract more and more chlorophyll. The filter cak was then extracted with a fresh 200 ml. portion of 90% hexane 10% acetone mixture, as before, that is, the filtrate was repeatedly recycled over the filter cake. A third 200 ml. portion of the 90% hexane 10% acetone mixture was slowly added to complete the hexane acetone extraction. The hexane acetone filtrates were combined to form the chlorophyll extract. The gray colored filter cake was dried to remove all traces of the solvents to form the extracted coagulum. The chlorophyll extract was thoroughly shaken with 200 ml. of water and allowed to settle to form two layers or phases. The acetone+water layer was separated, and the water extraction of acetone was continued by two more 200 ml. portions of water. The acetone+water layers were combined and fractionally distilled as shown by the acetone recovery step to recover acetone for reuse.

The hexane chlorophyll extract freed of acetone was filtered and hexane distilled for the recovery of hexane for reuse and to concentrate the chlorophyll to about 200 ml. in volume. This chlorophyll concentrate was then given a methanol extraction by carefully adding 20 ml. 90% methanol with mild agitation and then allowed to settle to form two layers or phases. The aqueous methanol (90% methanol) phase was quite yellow and was drawn off of the bottom as the methanol, carotenoids, fats, waxes, etc. Four more portions of 90% methanol of 20 ml. each were used as before to complete the methanol extraction. The methanolic layers were combined and distilled for the methanol recovery step to recover the methanol and crude carotenoid material.

The extracted chlorophyll concentrate was distilled to remove and recover all hexane. The residue was viscous dark green grease-like mass weighing 4.80 grams constituting the oil soluble chlorophylls, which upon chemical analysis, showed it to contain 1.25 grams of pure chlorophyll or 26%.

*Example 2*

A sample of freshly harvested papaya plants including the major portion of the trunks and all of the leaves and stems were chopped into pieces and treated as described hereinabove to obtain a green coagulate or coagulum.

The green coagulum was mixed with 150 ml. of distilled water, and the pH was raised to 9.8 by the addition of a sodium hydroxide solution. This alkaline mixture was rapidly heated with good agitation to 95° C. and held at this temperature for 1.5 minutes, then rapidly cooled with the aid of ice water. This heat treated or blanched green mass was dehydrated in a vacuum oven. The dehydrated material was finely ground and mixed with 200 ml. of pure hexane to remove a large portion of the yellows or hexane soluble impurities. The slurry was transferred to a suction filter to separate the yellow extract, and the hexane extraction was completed by slowly adding small portions of fresh hexane to the filter cake until the filtrate began to come through green. This required about 250 ml. of hexane. The hexane extracted coagulum was mixed with 300 ml. of a hexane acetone mixture containing 80% hexane and 20% acetone by volume for approximately forty-five minutes. A dark green colored chlorophyll extract was obtained upon suction filtration.

The filter cake was extracted with a fresh 200 ml. portion of the 80% hexane 20% acetone mixture. The filtrate was separated and recycled over the filter cake four times. Fresh 80% hexane 20% acetone mixture was then carefully added in small portions to complete the hexane acetone extraction which was evidenced by an almost colorless filtrate coming through. This required another 300 ml. of the hexane acetone mixture. All of the hexane acetone filtrates were combined to constitute the chlorophyll extract.

A water extraction of acetone to separate the acetone as acetone+water from the chlorophyll extract was accomplished by the addition of 200 ml. of water, followed by agitation for a few minutes, then settling to form two phases or layers. The acetone water layer was separated, and three more 200 ml. portions of water were used, as before, to remove all of the acetone. The aqueous acetone extracts were combined, and the acetone recovered by fractional distillation as in the acetone recovery step. The remaining hexane chlorophyll extract was filtered and distilled to recover hexane and to concentrate the chlorophyll extract to approximately 250 ml. in volume. The concentrated chlorophyll extract was mixed with 25 ml. of 90% methanol to effect the first part of the methanol extraction. A total of six more 25 ml. portions of 90% methanol was required to complete the methanol extraction as evidenced by a practically colorless methanolic extract. The last traces of methanol were removed by washing the chlorophyll phase with several portions of water. The methanolic extracts were combined and fractionally distilled to recover methanol and a residue of fatty carotenoid material. Distillation of the hexane permitted its recovery, and a dark green chlorophyll residue weighing 4.52 grams. The entire residue was readily soluble in the common edible oils. Chemical analysis showed it to contain some 1.51 grams of chlorophyll or 33.4% pure.

*Example 3*

A 300 gram sample of dehydrated green coagulum representing approximately 10 kilograms of fresh green papaya plants was made by combining several smaller portions previously made by methods similar to those used in examples numbered 1 and 2. It was finely ground and made into a slurry with 1 liter of hexane and transferred to a Buchner suction filter. The filtrate thus obtained was quite yellow. The filter cake was extracted with several small portions of hexane until the filtrates began to show green and thus a loss of chlorophyll. The filter cake was suspended in 2 liters of 85% hexane 15% acetone mixture. The green extract was separated by suction filtration, and the filtrate recycled over the filter cake five times during which its color became quite dark green. The filter cake was further extracted with a 1.5 liter portion of clean or fresh 85% hexane 15% acetone mixture, and the filtrates again recycled five times. The filter cake still wet with the hexane acetone mixture was extracted or washed with small portions of fresh 85% hexane 15% acetone mixture until a practically colorless filtrate was obtained. This required the use of a total of 1.25 liters of the hexane acetone mixture. The hexane acetone filtrates were combined to make up the chlorophyll extract. The filter cake yielded 265 grams of extracted coagulum when completely dry.

Acetone was separated from the chlorophyll extract by adding 1.5 liters of water, mildly agitating, settling, and separating the acetone+water layer or phase. The water extraction of acetone was completed by repeating this water washing four times, using 1 liter of water each time.

The aqueous acetone extracts were combined, and the acetone separated by fractional distillation as in the acetone recovery step. The chlorophyll extract was reduced in volume to about 1500 ml. by distillation of the hexane as in the distill hexane to concentrate step.

The carotenoids and other yellows and fats were separated by giving the chlorophyll concentrate a methanol extraction with 200 ml. of 90% methanol followed by five 100 ml. extractions using the 90% methanol. The methanol extraction was completed by washing twice with 200 ml. portions of water. The methanolic water extracts were combined and distilled to recover the methanol and the carotenoids, fats, waxes, and other fat soluble substances as indicated in the methanol recovery step. The purified chlorophyll extract was distilled to recover all of the remaining hexane as in the distill hexane step and to yield a residue containing 6.1 grams of oil soluble chlorophylls. The finished oil soluble chlorophyll product was a dark green grease-like mass weighing 19.2 grams and was thus 31.8% pure chlorophyll.

Figure 3:
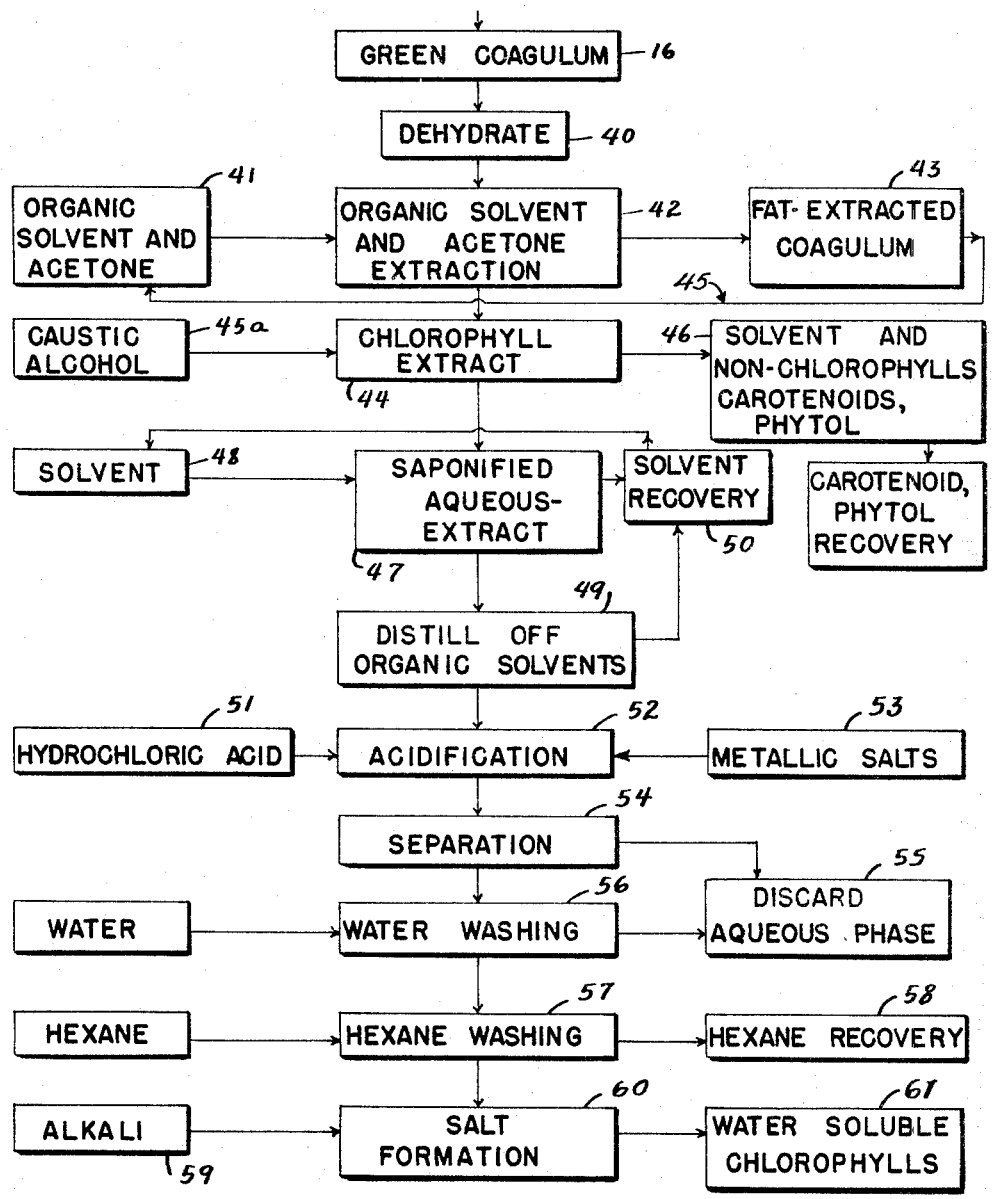
FIG. 3 is a schematic diagram illustrating a method of recovering water-soluble chlorophylls from papaya plants.

FIG. 3 represents a flow diagram of the various steps involved in the recovery of water-soluble chlorophylls from papaya plants. The green coagulum 16 is obtained from papaya plants as previously described, and the flow diagram shows the operations and processes necessary from this point on. The pH of the green coagulum 16 first is raised from the range 4.0 to 4.5 by the addition of alkalies, as previously explained, to between 7 and 10, preferably approximately 8.5 to reduce the destructive effects of the acidic action on the chlorophylls present. If the green coagulum is to be held in a moist condition for any length of time, it should be heat treated or blanched to destroy the enzymes present as previously described. It is generally necessary and as represented at 40 to dehydrate the green coagulum for the recovery of the oil soluble chlorophylls, but dehydration is not required for recovery of the water-soluble chlorophylls since the solvent mixtures used are very effective in the presence of water. However, dehydration is certainly advisable to preserve it if it is not to be extracted for several days or weeks.

Several chlorophyll solvents and solvent mixtures have been previously mentioned, and specific examples illustrating some of the preferred or more effective ones will follow. Although the solvent mixture represented at step 42 is, for purposes of description, a hexane acetone mixture, the method of the present invention with regard to both FIGS. 2 and 3 is not limited to this particular solvent mixture. Most of the water immiscible organic solvents hereinbefore mentioned are quite effective in extracting the fat solubles from thoroughly dehydrated green coagulum 16, but not on the moist or wet green coagulum 16. Dehydration may be a costly operation, and it thus becomes advisable to use a mixture of both water immiscible and water-soluble solvents. Acetone, methanol, ethanol, normal-propanol, and isopropanol are all quite effective in making it possible to use some of the more effective chlorinated hydrocarbons like trichloroethylene and perchloroethylene as mixtures to effect the extraction of the fat soluble plant constituents in the presence of considerable moisture or water content. Acetone is the solvent found best due largely to its relatively low cost, low boiling point, low heat of evaporation, and ease of separation so that it can be fractionally distilled and recovered for reuse.

Thus, the green coagulum 16 is extracted with a mixture of organic solvent+acetone as above generally described from a supply 41 until practically all of the chlorophylls (95% to 99%) are extracted to yield a fat extracted coagulum represented at 43 and a crude chlorophyll extract represented at 44. All solvents are recovered from the fat extracted coagulum by any suitable means such as by simple steam distillation and returned to supply 41 for reuse as shown in FIG. 5 at 45. The chlorophyll liquid extract remaining at 44 is then treated with a strong caustic alcohol solution such as caustic methanol solution from source 45a to effect complete saponification of the chlorophylls present. This process requires only a few minutes, one to five minutes, if good agitation is used and no heat is required, and the following changes occur:

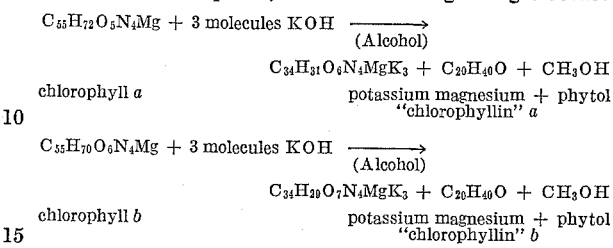

Thus, the chlorophylls are chemically transformed to phytol and the water-soluble potassium salts of the chlorins and rhodins or what are commercially known as the chlorophyllins or water-soluble chlorophylls. Upon settling, the saponification mixture separates into two liquid phases or layers, represented respectively at 46 as the solvent+nonchlorophylls, which layer contains the carotenoids, fats, waxes, sterols, phytol, and other fat soluble impurities and at 47 as the saponified aqueous extract that contains the chlorophylls and also still contains considerable amounts of fat soluble impurities.

The saponified aqueous chlorophyll containing extract 47 is then repeatedly extracted with the particular solvent being used, that is, hexane if a mixture of hexane and acetone with the original extracting solvent mixture or perchloroethylene and acetone was the original extracting solvent mixture, and so on with other solvent mixtures. This step is represented at 48 and is most important to produce very high purity in the final products and to prevent the formation of troublesome emulsions. The solvents are separated and recovered for reuse by fractional distillation techniques well known to all. This is represented at 49 and 50 in FIG. 3.

The potassium magnesium chlorophyllins result from the distillation of all organic solvents, represented at 49, leaving an aqueous solution that still fluoresces a blood red in sunlight. This material can be concentrated and refined by additional processing with alcoholic and acetone extractions to concentrations above 35%, if desired.

The potassium magnesium chlorophyllins are relatively unstable while the copper chlorophyllins are relatively stable as are several other metallic chlorophyllins, such as cobalt, iron, bismuth, nickel, etc. These various metallic chlorophyllins are made by dissolving the potassium magnesium chlorophyllins in water, adding the desired metal as a water-soluble salt, such as the chloride or sulfate, as represented at 53 and acidification with a suitable acid such as hydrochloric acid wherein the pH is gradually lowered to about 1.5 over a period of approximately 6 to 9 hours. The acidification step is represented at 51, 52, and 53.

During this process, the magnesium atom is replaced by the metallic atom, and the potassium salt is converted to the insoluble acid form, and the mixture is subjected to a separation 54 by suitable means as by centrifugation or simple settling. The aqueous phase is discarded as shown at 55, and the precipitate is washed thoroughly with water as shown at 56 and then with fresh organic solvent such as hexane, as illustrated at 57. The hexane is recovered for reuse as represented at 58 by suitable means such as distillation.

All traces of hexane are distilled from the solution of phytochlorins and phytorhodins leaving them in a quite pure form with only a small amount of water. These phytochlorins and phytorhodins are the acid form and must be treated with alkalies such as sodium hydroxide or potassium hydroxide for the salt formation which yields either the sodium or potassium metallic chlorophyllins or the water-soluble chlorophylls, depending upon which metallic salts and hydroxides are used. This step is represented at 59 and 60 in the FIG. 3 drawing. The aqueous solutions of the various chlorophyllins are clarified by filtration or centrifugation to remove all insoluble materials and finally dried by suitable means to produce the commercial chlorophyllins represented at 61.

Thus, if copper sulfate was added as the metallic salt during the acidification step and potassium hydroxide was added as the alkali during the salt formation, the water-soluble chlorophylls would be potassium copper chlorophyllin.

The entire method will be more fully explained and detailed by the following examples which are merely given for purposes of illustration and not by way of limitation.

*Example 4*

A sample of freshly harvested and chopped papaya plants was treated to obtain a green coagulum or coagulate as described hereinabove.

The wet or moist green coagulum was mixed with 0.5 gram of sodium carbonate and then with 1 liter of an organic solvent acetone mixture containing 75% hexane and 25% acetone by volume, stirred, and then filtered. The residue was again mixed or extracted with 500 ml. of the 75% hexane 25% acetone mixture and filtered. This second filtrate was recycled five times over the residue or filter cake. The residue was then extracted with 1 liter of 90% hexane 10% acetone mixture, and the filtrates or extracts recycled five times. The solvent acetone extraction was completed by washing the residue with 500 ml. of 90% hexane 10% acetone mixture to leave the fat extracted coagulum as the residue. All hexane acetone filtrates or extracts were combined to make up the chlorophyll extract which was vigorously mixed with 300 ml. of caustic methanol or methanol saturated with potassium hydroxide for ten minutes.

Upon settling for a few minutes, a clear yellow layer of the solvent plus nonchlorophylls formed on the top, and a dark green layer of the saponified aqueous extract formed on the bottom and separated. The saponified aqueous extract containing the potassium magnesium chlorophylls $a$ and $b$ was extracted three times with (two volumes of) pure hexane as the solvent.

The hexane extracted saponified layer was steam distilled to distill off (practically all) organic solvents. The residue was made up to 300 ml. by the addition of water, and 1.5 grams of pulverized copper sulfate (penta hydrate) was added and dissolved with stirring. The pH of this solution was 9.8 and it was lowered to 5.8 by the addition of 3 normal hydrochloric acid, whereupon a dark green (almost black) precipitate of copper chlorine $e$ and copper rhodin $g$ could be seen. Stirring was continued, and the pH gradually lowered to 4.5 by the addition of 1.5 normal hydrochloric acid over a period of forty-five minutes at room temperature where it was held for 2.5 hours. More 1.5 normal hydrochloric acid was added slowly over a period of one hour to lower the pH gradually to 1.55, where it was held for four hours with mild stirring. The precipitated material (mainly copper chlorin $e$ and copper rhodin $g$) was separated by centrifugation and water washed with five 100 ml. portions of water. It was then hexane washed with three 100 ml. portions of hexane.

The thoroughly washed precipitate was suspended in 30 ml. of distilled water and warmed to 75° C., and a solution of 20% potassium hydroxide carefully added to raise the pH to 11.5. The resulting dark green solution was filtered through asbestos and evaporated to dryness on a steam bath to yield 1.10 grams of potassium copper chlorophyllins that assayed 97% pure.

*Example 5*

Fifteen hundred grams of immature papaya plants were treated as described above to obtain a green coagulum or coagulate.

The moist green coagulum was mixed with 0.35 gram of sodium carbonate and partially dehydrated on a steam bath. A thick paste-like mass was obtained which was first mixed or extracted with 500 ml. of a solvent mixture containing 75% hexane and 25% acetone by volume, then filtered. The residue was next extracted with 500 ml. of a solvent mixture containing 90% hexane and 10% acetone, and the filtrate recycled three times over the residue remaining in the filter. The residue was repeatedly extracted with small portions of fresh 90% hexane 10% acetone mixture until the filtrate was practically colorless—a total of 500 ml. of the mixture was used.

Upon drying, the residue or fat extracted coagulum weighed 12.2 grams. Chemical assay showed it to have 5.45% nitrogen equivalent to a crude protein content of 34.6%. The filtrates were combined and saponified with 200 ml. of methanol saturated with potassium hydroxide using vigorous agitation at room temperature for approximately ten minutes, followed by settling for about another thirty minutes to completely separate the upper yellow phase and the dark green lower phase containing the water-soluble saponified materials.

The aqueous solvent containing the potassium magnesium chlorophylls was extracted or washed twice with two volumes of hexane by first mixing and then allowing to settle into two phases which could be separated. The hexane extracted phase was steam distilled to remove practically all of the organic solvents. The crude water-soluble potassium magnesium chlorophyllins were diluted with distilled water to a volume of 250 ml. The solution was stirred, and 1.25 grams of copper sulfate was added. A solution of 3 normal hydrochloric acid was slowly added to lower the pH from about 10 to 5.5 at which point a precipitate of the chlorins and rhodins could be seen.

The lowering of the pH at this time was further slowed down, and more dilute hydrochloric acid (1.5 normal HCl was added over a period of about one hour until a pH of 4.5 was reached. Stirring was continued for two hours during which time the pH was maintained at 4.5. The pH was then lowered gradually over a period of close to one hour to 1.5 by the addition of more 1.5 normal hydrochloric acid. Stirring was continued and the pH maintained at 1.5 an additional 3.5 hours. The precipitated copper chlorin $e$ and rhodin $g$ were separated by filtration, and the residue washed with water until the filtrates were practically neutral. It was next washed with small portions of hexane until the filtrates were practically colorless. The residue was suspended in 25 ml. of distilled water and warmed to 75° C.; a solution of potassium hydroxide (20% by weight) was slowly added to raise the pH to 10.5. This solution was filtered through asbestos and dried on a steam bath. The yield was 0.80 gram of 96.5% purity when assayed as potassium copper chlorophyllin.

*Example 6*

Young papaya plants two and three feet high were harvested and treated as described herein to obtain a green coagulate or coagulum.

The green coagulum residue was mixed with 1.0 gram of calcium carbonate. It was then mixed with 500 ml. of 80% perchloroethylene 20% acetone (by volume) mixture for thirty minutes and filtered. The residue was again mixed with 500 ml. of the 80% perchloroethylene 20% acetone mixture, stirred for thirty minutes, and filtered. The residue was extracted with several small portions of perchloroethylene acetone mixture (80% perchloroethylene 20% acetone) until the filtrate was practically colorless.

The chlorophyll containing extracts were combined and saponified with 150 ml. of saturated potassium hydroxide methanol by vigorously stirring at room temperature for ten minutes. The aqueous phase containing the potassium magnesium chlorophyllins rose to the top (due to the high density of perchloroethylene), and the aqueous phase separated. The perchloroethylene phase was mixed with two 100 ml. portions of water to extract all of the chlorophyllins, and the aqueous or water-soluble phase was extracted twice with 500 ml. portions of perchloroethylene and then steam distilled to remove practically all of the organic solvents. One gram of copper sulfate was dissolved in the residue after making its volume up to 200 milliliters with distilled water and the pH carefully and slowly lowered to 5.2 (the first definite sign of precipitate formation) by adding dilute hydrochloric acid over a period of some twenty minutes.

During the next one hour, the pH was gradually lowered to 4.2 by the addition of more dilute hydrochloric acid, and this pH maintained for the next two hours. The pH was further lowered to 1.4 during the next thirty minutes by the addition of more dilute hydrochloric acid which was maintained for the next six hours. Mild agitation was used throughout the acidification step. The insoluble copper phytochlorin and copper phytorhodin were separated by centrifugation and washed with five 100 ml. portions of distilled water and then with two 100 ml. portions of hexane. The washed residue was suspended in 25 ml. of distilled water with stirring and a solution of 50% sodium hydroxide carefully added to effect solution of the material. The final pH was 10.2. The sodium copper chlorophyllin solution was filtered and evaporated to dryness on a steam water bath to yield 645 milligrams with a purity of 98%.

Example 7

One thousand grams of green papaya plants were chopped into pieces about 1 inch in length and dipped in a 0.1% solution of ammonium hydroxide and then thoroughly macerated by grinding and mixing. Pressing produced 485 ml. of green liquor. The pulpous portion was mixed with 500 ml. of a solution containing 0.25% of sodium bisulfite, 0.1% of sodium chloride, 0.1% of sodium hydroxide, and 0.1% of diethylenetetraamino acetic acid. After mixing for fifteen minutes, a second pressing produced 545 ml. of green liquor. Dehydration of the pulpous portion in an oven at 103° C. produced 112.4 grams of papaya pulp.

The green liquors were combined, the pH adjusted to 4.3 with dilute hydrochloric acid, and the temperature carefully raised to 45° C. where it was held for thirty minutes. The green coagulum was separated from the supernatant proteolytic enzyme solution by decantation followed by filtration. The moist green coagulum weighed 60.2 grams, and 1.0 gram of sodium carbonate was added and well mixed. Its volume was reduced approximately 50% on a steam water bath. It was then mixed with 500 ml. of an extracting solvent mixture that was 65% trichloroethylene and 35% acetone by volume. Mixing was continued for thirty minutes and allowed to settle for thirty minutes. This procedure of mixing and settling was repeated four times. The residue was similarly extracted with a second 500 ml. portion of 90% trichloroethylene 10% acetone and finally with a 300 ml. portion of the 90% trichloroethylene 10% acetone mixture. The trichloroethylene acetone extracts were combined, filtered, and washed free of acetone with water. Saponification was effected by vigorously mixing the trichloroethylene chlorophyll extract with 150 ml. of methanol saturated with potassium hydroxide for fifteen minutes.

Upon settling, the phases were separated and the trichloroethylene phase washed with three 100 ml. portions of water. The saponified aqueous phases were combined with two 100 ml. portions of trichloroethylene. The saponified aqueous phase was steam distilled to free it of organic solvents. The solvent free solution was cooled to room temperature and 1.0 gram of copper sulfate added after making its volume up to 200 milliliters with distilled water.

The pH was lowered to 5.1 by adding slowly dilute hydrochloric acid with mild stirring over a period of thirty minutes, at which time the first signs of the precipitation of the chlorins and rhodins could be seen. During the next 45 minutes, the pH was further lowered to 4.2 by the slow addition of dilute hydrochloric acid and then maintained at this pH for 2.5 more hours. The pH was then gradually lowered to 1.5 by adding dilute hydrochloric acid during the next one hour and maintained there for four hours. The precipitate of copper chlorin $e$ and copper rhodin $g$ were recovered by filtration and washed free of chlorides with distilled water. It was washed with several small portions of hexane until the filtrate was practically colorless. The washed precipitate was suspended in 25 ml. of distilled water and warmed to 75° C. to remove all traces of hexane. The precipitate was dissolved by carefully adding a 20% solution of potassium hydroxide until a pH of 10 was reached. Chemical analysis showed it to contain 582 milligrams of potassium copper chlorophyllins.

Example 8

One thousand grams of young green papaya plants were chopped into pieces about 1 to 2 inches in length and then dipped in 500 ml. of a solution containing 0.1% sodium sulfide and 0.1% sodium hydroxide. After draining off most of the extraction solution, the plant pieces were ground in a food chopper, mixed, and then pressed to obtain 525 ml. of green liquor. The pressed pulp was extracted with 500 ml. of a solution containing 0.1% sodium sulfide, 0.1% of sodium hydroxide, and 0.1% of sodium paracymene sulfonate by mixing and then pressing to obtain an additional 580 ml. of green liquor. The pH of the combined green liquors was adjusted to 4.2 by the addition of a solution of citric acid (50% by weight) and digested at 40° C. for thirty minutes. The green coagulum was separated and treated with 500 ml. of a chorophyll solvent mixture containing 70% hexane plus 30% acetone. The chlorophyll containing organic phase was separated, with the green coagulum containing phase was treated with another 500 ml. of the 70% hexane 30% acetone mixture, then twice more with 250 ml. portions of a 90% hexane 10% acetone solvent mixture. The resulting extracted coagulum, when dried, weighed 8.5 grams and assayed 65.2% crude protein.

The chlorophyll containing extracts were combined and filtered to remove all suspended material. Water washing removed the acetone. The resulting chlorophyll extract was saponified with 150 ml. of saturated methanolic potassium hydroxide using good agitation at room temperature for ten minutes, then allowed to settle. After one hour of settling, the saponified phase was separated, and the hexane phase washed with three portions of 100 ml. of water. The aqueous saponified phases were combined and extracted twice with 100 ml. portions of hexane. The saponified phase was heated to 82° C. to steam distill off the organic solvents. The solution was cooled to room temperature, and 1.0 gram of ferrous sulfate was added after making the volume up to 200 milliliters with distilled water and the pH had been lowered to 7.5 by the addition of 3 normal hydrochloric acid. After complete solution of the ferrous sulfate, the pH was slowly lowered over a period of thirty minutes by the addition of more hydrochloric acid to 5.0 where it was held for one hour. The pH was lowered to 4.5 by the addition of 1.5 normal hydrochloric acid over the next one hour and maintained there for four hours. It was further lowered by the addition of more 1.5 normal hydrochloric acid to 1.5 and maintained there for four more hours. Mild stirring was used throughout the acidification step.

The precipitate of iron chlorin $e$ and iron rhodin $g$ was recovered by filtration and washed free of all salts and acid by distilled water. It was next washed practically free of yellow pigments with hexane and dried to yield 475 milligrams. A 100 mg. portion was suspended in 25 ml. of distilled water and dissolved by carefully adding a solution of sodium hydroxide until a final pH of 9.5 was reached and then filtered and dried on a steam bath to a thick paste and completed in a vacuum desiccator. The yield was 109 mg. of sodium iron chlorophyllin. Another 100 mg. portion of the iron chlorin $e$ and iron rhodin $g$ mixture was suspended in 25 ml. of distilled water, and a solution of potassium hydroxide added until a final pH of 10 was reached. The solution was filtered and dried to a thick paste on a steam bath and finally to a blackish green solid in a vacuum desiccator. The yield of completely water-soluble potassium iron chlorophyllin was 110 mg.

*Example 9*

Several kilograms of papaya plants, including leaves, stems, and trunks were chopped and wet with a solution of 0.1% sodium hydroxide, 0.1% sodium sulfide, and 0.1% sodium benzene sulfonate, then macerated and mixed by grinding. A 1000 gram portion of this mass was pressed to obtain 480 ml. of a green papaya plant liquor. The pressed pulpous portion resulting was rewet with 500 ml. of the same solution first used to wet the chopped pieces and mixed for about twenty minutes at room temperature. The second pressing produced 540 ml. more green liquor. Upon dehydration, the pressed mass yielded 148 grams of dehydrated papaya pulp. The green liquors were combined, and their pH was adjusted to 4.25 by adding dilute hydrochloric acid. A thick green coagulum was formed by enzymatically digesting the green liquors at 40° C. for thirty minutes and allowing to settle for thirty minutes.

The proteolytic enzyme containing supernatant liquid was decanted from the greeen coagulum which was allowed to drain further in a filter funnel fitted with paper. One gram of sodium carbonate was added to make it definitely alkaline and then treated with a solvent mixture containing 300 ml. of benzene and 200 ml. of acetone or 60% benzene and 40% acetone by mixing, and layers separated upon settling. The green coagulum layer was again treated with another 500 ml. portion of 60% benzene and 40% acetone solvent mixture as before, then, twice with 250 ml. portions of the 60% benzene and 40% acetone solvent mixture as before. The chlorophyll containing extracts were combined and filtered. The extracted coagulum was found to contain some 4 grams of crude protein. The chlorophylls were saponified by vigorously mixing with 150 ml. of methanol saturated with potassium hydroxide for fifteen minutes. The saponified chlorophyll layer was separated, and the upper layer was washed with two 50 ml. portions of distilled water. The aqueous phases were combined and treated twice with 200 ml. portions of benzene to remove chlorophyll impurities and troublesome natural papaya plant emulsifying constituents. The aqueous layer was steam distilled to remove practically all remaining organic solvents, leaving as a result an aqueous solution of crude potassium magnesium chlorophyllins. The solution was cooled to room temperature and the volume made up to 200 milliliters by adding distilled water, and the pH lowered to 7.2 by adding 3 normal hydrochloric acid. Then, 1.0 gram of nickelous nitrate $(Ni(NO_3)_2 \cdot 6H_2O)$ was added and stirred until completely dissolved.

The pH was lowered to 5.2 and held there for two hours by carefully adding 1.5 normal hydrochloric acid. The pH was then lowered to 4.25 by the addition of more 1.5 normal hydrochloric acid during the next one hour and maintained at this pH for about six hours. The precipitated nickel chlorin $e$ and nickel rhodin $g$ were separated by filtration and washed free of all salts and acids by distilled water and then with hexane until practically free of yellow papaya plant pigments. A yield of 458 milligrams was obtained upon drying. A 100 mg. portion of the mixture of nickel chlorin $e$ and nickel rhodin $g$ was suspended in 25 ml. of distilled water and sodium hydroxide carefully added to dissolve it by forming the sodium nickel chlorophyllins. When a constant pH of 9.8 was reached, the solution was filtered and taken to dryness by first concentrating to a thick paste on a steam bath and then in a vacuum desiccator to produce 102 mg. of the sodium nickel chlorophyllins which had good water solubility. Another 100 mg. portion of the mixture of nickel chlorin $e$ and nickel rhodin $g$ was suspended in distilled water and converted to the soluble potassium nickel chlorophyllins by carefully adding a solution of potassium hydroxide until a constant pH of 10 was reached. The solution was filtered through asbestos, concentrated to a thick paste on a steam bath, and then to a blackish green solid in a vacuum desiccator. The yield of potassium nickel chlorophyllins was 105 mg.

Several different chlorophylls are found in nature, but the ones of most interest are chlorophyll $a$ and chlorophyll $b$ which occur in all green plants. These chlorophylls are very similar chemically, for example, chlorophyll $b$ can be made by simply substituting a formyl group for a methyl group of chlorophyll $a$. The chemical structure of these chlorophylls is unique and complicated which explains many of their particular and peculiar properties. There is a close relationship of the chlorophylls to hemin of human hemoglobin, and for this reason, chlorophyll is often referred to as plant blood. The central portion of the chlorophyll molecule contains a magnesium atom that is readily replaced by hydrogen atoms by means of dilute acids while it is quite stable to alkalies.

Several metallic atoms can be used to replace the central magnesium atom and thus make a whole series of different chlorophylls. The simple replacement of the magnesium atom by hydrogen atoms produces a series of chemicals known as pheophytins. Chlorophylls form pheophorbides when treated with strong acids which not only replace the magnesium but also split off the phytyl group. Alkaline hydrolysis of the chlorophylls ruptures the carbocyclic ring to produce salts of the chlorins, which are known commercially as chlorophyllins, most of which are the water-soluble chlorophyllins. Phytol or plant alcohol is also split off by alkaline hydrolysis. Acidification of these alkaline water-soluble chlorophyllins $a$ produces the phytochlorins, while the chlorophyllins $b$ produce the phytorhodins or rhodins.

Chlorophyll $a$ is bluish-green in color, and its empirical formula is $C_{55}H_{72}O_5N_4Mg$, while chlorophyll $b$ is yellowish-green in color, and its empirical formula is $C_{55}H_{70}O_5N_4Mg$.

What is claimed is:
1. A method of recovering chlorophylls from papaya plants comprising the steps of:
 (a) extracting a liquid from the plants,
 (b) adjusting the pH of the liquid to 4.0–4.5,
 (c) heating and digesting the liquid until a coagulate is formed therein,
 (d) separating the liquid from the coagulate,
 (e) neutralizing the coagulate and heating to destroy the enzymes present,
 (f) dehydrating the coagulate,
 (g) solvent extracting the dehydrated coagulate with hydrocarbon solvents having a boiling range of approximately 65° C. to approximately 85° C. for separation of carotenoids from the chlorophyll containing coagulate,
 (h) solvent extracting the coagulate with a solvent to recover the chlorophylls from the residue,
 (i) separating the solvent from the chlorophylls, and
 (j) refining the separated chlorophylls.
2. The method of claim 1 wherein the solvent used for solvent extracting the dehydrated coagulate is selected from petroleum ethers or naphthas having a boiling range of approximately 65° C. to approximately 85° C.
3. The method of claim 1 wherein the solvent used for extracting the chlorophyll from the remaining residue is a hexane acetone mixture.

4. The method of claim 3 wherein the acetone content of the hexane acetone mixture is by volume between approximately 5% to approximately 25%.

5. The method of claim 1 wherein at least part of the solvent is separated from the chlorophylls by a water extraction.

6. The method of claim 1 wherein at least part of the solvent is separated from the chlorophylls by a water extraction and recovering the balance of the solvent by distillation.

7. The method of claim 1 wherein the refining of the separated chlorophylls is effected by a solvent in which any remaining carotenoids, fats, and waxes are soluble.

8. The method of claim 1 wherein the refining of the separated chlorophylls is effected by solvent extracting with methanol.

9. A method of recovering chlorophyllins from papaya plants comprising the steps of:
(a) extracting a liquid from the plants,
(b) adjusting the pH of the liquid to 4.0–4.5,
(c) heating and digesting the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous chlorophyllins containing solution,
(h) separating the aqueous chlorophyllins containing solution from the organic solvent,
(i) solvent extracting the aqueous chlorophyllins containing solution with an organic solvent to further purify the aqueous chlorophyllins containing solution,
(j) separating the organic solvent from the aqueous chlorophyllins containing solution, and
(k) refining the aqueous chlorophyllins containing solution.

10. A method of recovering chlorophyll derivation from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous chlorophyllins containing solution,
(h) separating the aqueous chlorophyllins containing solution from the original chlorophyll containing extract,
(i) solvent extracting the aqueous chlorophyllins containing solution,
(j) separating the organic solvent from the aqueous chlorophyllins containing solution,
(k) adding a water-soluble metallic salt to the aqueous chlorophyllins containing solution,
(l) acidifying the resulting mixture by gradually lowering the pH to about 1.5 over a period of approximately 6 to 9 hours to form a precipitate,
(m) separating the resulting precipitate from the liquid,
(n) washing the residue with an organic solvent,
(o) alkalinizing the residue to form a water soluble chlorophyllin salt, and
(p) purifying the water soluble chlorophyll derivatives.

11. The method of claim 10 wherein the water-soluble metallic salt is from the group of: copper, cobalt, iron, bismuth, and nickel.

12. A method of recovering copper chlorin e and copper rhodin g from a coagulate obtained from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous chlorophyllins containing solution,
(h) separating the aqueous chlorophyllins containing solution from the original chlorophyll containing extract,
(i) solvent extracting the aqueous chlorophyllins containing solution,
(j) separating the organic solvent from the aqueous chlorophyllins containing solution,
(k) adding a water-soluble copper salt to the aqueous chlorophyllins containing solution,
(l) acidifying the resulting mixture by gradually lowering the pH to about 1.5 over a period of approximately 6 to 9 hours to form a precipitate comprising copper chlorin e and copper rhodin g, and
(m) purifying the precipitate to recover the copper chlorin e and copper rhodin g.

13. A method of recovering potassium copper chlorophyllins from a coagulate obtained from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous solution containing chlorophyllins,
(h) separating the aqueous chlorophyllins containing solution from the original chlorophyll containing extract,
(i) solvent extracting the aqueous chlorophyllins containing solution,
(j) separating the organic solvent from the aqueous chlorophyllins containing solution,
(k) adding a water-soluble copper salt to the aqueous chlorophyllins containing solution,
(l) acidifying the resulting mixture by gradually lowering the pH to about 1.5 over a period of approximately 6 to 9 hours to form a precipitate comprising copper chlorin e and copper rhodin g,
(m) separating the precipitate from the liquid,
(n) washing the precipitate with an organic solvent,
(o) alkalinizing the precipitate with potassium hydroxide to form an aqueous solution of potassium copper chlorophyllins, and
(p) separating the potassium copper chlorophyllins from the solution.

14. A method of recovering potassium magnesium chlorophyllins from a coagulate obtained from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate, (e) neutralizing the coagulate and heating to destroy the enzymes present,
(f) solvent extracting the coagulate with an organic solvent to separate the chlorophylls from the coagulate, and
(g) saponifying the chlorophyll solution with methanol and potassium hydroxide to separate the potassium magnesium chlorophyllins.

15. A method of recovering sodium copper chlorophyllins from a coagulate obtained from papaya plants comprising the steps of:
    (a) extracting a liquid from the plants,
    (b) adjusting the pH of the liquid to 4.0–4.5,
    (c) digesting the liquid until a coagulate is formed therein,
    (d) separating the liquid from the coagulate,
    (e) neutralizing the coagulate and heating to destroy the enzymes present,
    (f) solvent extracting the coagulate with an organic solvent to separate the chlorophylls from the coagulate,
    (g) saponifying the chlorophyll containing extract to form an aqueous solution containing chlorophyllins,
    (h) separating the aqueous chlorophyllins containing solution from the original chlorophyll containing extract,
    (i) solvent extracting the aqueous chlorophyllins containing solution,
    (j) separating the organic solvent from the aqueous chlorophyllins containing solution,
    (k) adding a water-soluble copper salt to the aqueous chlorophyllins containing solution,
    (l) acidifying the resulting mixture by gradually lowering the pH to about 1.5 over a period of approximately 6 to 9 hours to form a precipitate comprising copper chlorin *e* and copper rhodin *g*,
    (m) separating the precipitate from the liquid,
    (n) washing the precipitate with an organic solvent,
    (o) alkalinizing the precipitate with sodium hydroxide to form an aqueous solution of sodium copper chlorophyllins, and
    (p) separating the sodium copper chlorophyllins from the solution.

16. A method of recovering iron chlorin *e* and iron rhodin *g* from papaya plants comprising the steps of:
    (a) extracting a liquid from the plants,
    (b) adjusting the pH of the liquid to 4.0–4.5,
    (c) digesting the liquid until a coagulate is formed therein,
    (d) separating the liquid from the coagulate,
    (e) neutralizing the coagulate and heating to destroy the enzymes present,
    (f) solvent extracting the coagulate with an organic solvent to separate the chlorophylls from the coagulate,
    (g) saponifying the chlorophyll containing extract to form an aqueous chlorophyllins containing solution,
    (h) separating the aqueous chlorophyllins containing solution from the original chlorophyll containing extract,
    (i) solvent extracting the aqueous chlorophyllins containing solution,
    (j) separating the organic solvent from the aqueous chlorophyllins containing solution,
    (k) adding a water-soluble iron salt to the aqueous chlorophyllins containing solution,
    (l) acidifying the resulting mixture by gradually lowering the pH to about 1.5 over a period of approximately 6 to 9 hours to form a precipitate comprising iron chlorin *e* and iron rhodin *g*, and
    (m) purifying the precipitate to recover the iron chlorin *e* and iron rhodin *g*.

17. A method of recovering potassium iron chlorophyllins from papaya plants comprising the steps of:
    (a) extracting a liquid from the plants,
    (b) adjusting the pH of the liquid to 4.0–4.5,
    (c) digesting the liquid until a coagulate is formed therein,
    (d) separating the liquid from the coagulate,
    (e) neutralizing the coagulate,
    (f) solvent extracting the coagulate with an organic solvent to separate the chlorophyllins from the coagulate,
    (g) saponifying the chlorophyllins containing extract to form an aqueous chlorophyllins containing solution,
    (h) separating the aqueous chlorophyllins containing solution from the original chlorophyll containing extract,
    (i) solvent extracting the aqueous chlorophyllins containing solution,
    (j) separating the organic solvent from the aqueous chlorophyllins containing solution,
    (k) adding a water-soluble iron salt to the aqueous chlorophyllins containing solution,
    (l) acidifying the resulting mixture by gradually lowering the pH to about 1.5 over a period of approximately 6 to 9 hours to form a precipitate comprising iron chlorin *e* and iron rhodin *g*,
    (m) separating the precipitate from the liquid,
    (n) washing the precipitate with an organic solvent,
    (o) alkalinizing the precipitate with potassium hydroxide to form an aqueous solution of potassium iron chlorophyllins, and
    (p) separating the potassium iron chlorophyllins from the solution.

18. A method of recovering sodium iron chlorophyllins from papaya plants comprising the steps of:
    (a) extracting a liquid from the plants,
    (b) adjusting the pH of the liquid to 4.0–4.5,
    (c) digesting the liquid until a coagulate is formed therein,
    (d) separating the liquid from the coagulate,
    (e) neutralizing the coagulate and heating to destroy the enzymes present,
    solvent to separate the chlorophyll from the coagu- iron chlorin *e* and iron rhodin *g*,
    late,
    (g) saponifying the remaining chlorophyll containing extract to form an aqueous solution containing chlorophyllins,
    (h) separating the aqueous chlorophyllins containing solution from the nonchlorophyll containing phase resulting from the saponification,
    (i) solvent extracting the aqueous chlorophyllins containing solution,
    (j) separating the organic solvent from the aqueous chlorophyllins containing solution,
    (k) adding a water-soluble iron salt to the aqueous chlorophyllins containing solution,
    (l) acidifying the resulting mixture by gradually lowering the pH to about 1.5 over a period of approximately 6 to 9 hours to form a precipitate comprising iron chlorin *e* and iron rhodin *g*,
    (m) separating the precipitate from the liquid,
    (n) washing the precipitate with an organic solvent,
    (o) alkalinizing the precipitate with sodium hydroxide to form an aqueous solution of sodium iron chlorophyllins, and
    (p) separating the sodium iron chlorophyllins from the solution.

19. A method of recovering nickel chlorine *e* and nickel rhodin *g* from papaya plants comprising the steps of:
    (a) extracting a liquid from the plants,
    (b) adjusting the pH of the liquid to 4.0–4.5,
    (c) digesting the liquid until a coagulate is formed therein,
    (d) separating the liquid from the coagulate,
    (e) neutralizing the coagulate and heating to destroy the enzymes present, (f) solvent extracting the coagulate with an organic solvent to separate the chlorophylls from the coagulate,
(g) saponifying the chlorophyll containing extract to form an aqueous chlorophyllins containing solution,
(h) separating the aqueous chlorophyll containing liquid from the original chlorophyll containing extract,
(i) solvent extracting the aqueous chlorophyllins containing solution,
(j) separating the organic solvent from the aqueous chlorophyllins containing solution,
(k) adding a water-soluble nickel salt to the aqueous chlorophyllins containing solution,
(l) acidifying the resulting mixture by gradually lowering the pH to about 1.5 over a period of approximately 6 to 9 hours to form a precipitate comprising nickel chlorin $e$ and nickel rhodin $g$, and
(m) purifying the precipitate to recover the nickel chlorin $e$ and nickel rhodin $g$.

20. A method of recovering potassium nickel chlorophyllins from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous solution containing chlorophyllins,
(h) separating the aqueous chlorophyllins containing solution from the original chlorophyll containing extract,
(i) solvent extracting the aqueous chlorophyllins containing solution,
(j) separating the organic solvent from the aqueous chlorophyllins containing solution,
(k) adding a water-soluble nickel salt to the aqueous chlorophyllins containing solution,
(l) acidifying the resulting mixture by gradually lowering the pH to about 1.5 over a period of approximately 6 to 9 hours to form a precipitate comprising nickel chlorin $e$ and nickel rhodin $g$,
(m) separating the precipitate from the liquid,
(n) washing the precipitate with an organic solvent,
(o) alkalinizing the precipitate with potassium hydroxide to form an aqueous solution of potassium nickel chlorophyllins in each instance, and
(p) separating the potassium nickel chlorophyllins from the solution.

21. A method of recovering sodium nickel chlorophyllins from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous solution containing chlorophyllins,
(h) separating the aqueous chlorophyllins containing solution from the original chlorophyll containing extract,
(i) solvent extracting the aqueous chlorophyllins containing solution,
(j) separating the organic solvent from the aqueous chlorophyllins containing solution,
(k) adding a water-soluble nickel salt to the aqueous chlorophyllins containing solution,
(l) acidifying the resulting mixture by gradually lowering the pH to about 1.5 over a period of approximately 6 to 9 hours to form a precipitate comprising nickel chlorin $e$ and nickel rhodin $g$,
(m) separating the precipitate from the liquid,
(n) washing the precipitate with an organic solvent,
(o) alkalinizing the precipitate with sodium hydroxide to form an aqueous solution of sodium nickel chlorophyllins in each instance, and
(p) separating the sodium nickel chlorophyllins from the solution.

22. A method of recovering cobalt chlorine $e$ and cobalt rhodin $g$ from papaya plants comprising the steps of:
(a) extracting a liquid from the plants,
(b) adjusting the pH of the liquid to 4.0–4.5,
(c) digestion the liquid until a coagulate is formed therein,
(d) separating the liquid from the coagulate,
(e) neutralizing the coagulate and heating to destroy the enzymes present,
(f) solvent extracting the coagulate with an organic solvent to separate the chlorophylls from the coagulate,
(g) saponifying the chlorophyll containing extract to form an aqueous solution containing chlorophyllins,
(h) separating the aqueous chlorophyllins containing solution from the original chlorophyll containing extract,
(i) solvent extracting the aqueous chlorophylls containing solution,
(j) separating the organic solvent from the aqueous chlorophyllins containing solution,
(k) adding a water-soluble cobalt salt to the aqueous chlorophyllins containing solution,
(l) acidifying the resulting mixture by gradually lowering the pH to about 1.5 over a period of approximate 6 to 9 hours to forms a precipitate comprising cobalt chlorin $e$ and cobalt rhodin $g$, and
(m) purifying the precipitate to recover the cobalt chlorin $e$ and copper rhodin $g$.

23. A method of recovering potassium cobalt chlorophyllins from papaya plants comprising the steps of:
(a) extracting a liquid from the plants,
(b) adjusting the pH of the liquid to 4.0–4.5,
(c) digesting the liquid until a coagulate is formed therein,
(d) separating the liquid from the coagulate,
(e) neutralizing the coagulate, and heating to destroy the enzymes present,
(f) solvent extracting the coagulate with an organic solvent to separate the chlorophylls from the coagulate,
(g) saponifying the chlorophyllins containing extract to form an aqueous solution containing chlorophyllins,
(h) separating the aqueous chlorophyllins containing solution from the nonchlorophyll containing phase resulting from the saponification,
(i) solvent extracting the aqueous chlorophyllins containing phase,
(j) separating the solvents from the liquid chlorophyllins containing solution,
(k) adding a water-soluble cobalt salt to the aqueous chlorophyllins containing solution,
(l) acidifying the resulting mixture by gradually lowering the pH to about 1.5 over a period of approximately 6 to 9 hours to form a precipitate comprising cobalt chlorin $e$ and cobalt rhodin $g$,
(m) separating the precipitate from the liquid,
(n) washing the precipitate with an organic solvent,
(o) alkalinizing the precipitate with potassium hydroxide to form an aqueous solution of potassium cobalt chlorophyllins, and (p) separating the potassium cobalt chlorophyllins from the solution.

24. A method of recovering metallic chlorophyllins from papaya plants comprising the steps of:
(a) treating the plants to recover a liquid portion and a pulpous mass,
(b) digesting the liquid portion to form a coagulate,
(c) solvent extracting the coagulate with an organic solvent to separate the chlorophylls from the coagulate,
(d) saponifying the chlorophyll containing extract with potassium hydroxide and methanol to form an aqueous solution containing potassium magnesuim chlorophyllins,
(e) separating the aqueous chlorophyllins containing solution from the nonchlorophyll containing phase resulting from the saponification,
(f) solvent extracting the aqueous chlorophyllins containing solution,
(g) separating the organic solvent from the potassium magnesium chlorophyllins containing solution,
(h) converting the potassium magnesium chlorophyllins in the solution to one of the metallic chlorophyllins of the family of copper, iron, cobalt, nickel, and the like by the steps of:
  (1) adding an aqueous solution of a water-soluble salt of the metal to be substituted for the magnesium,
  (2) uniformly lowering the pH of the solution to approximately 5.8 while stirring,
  (3) stirring and uniformly lowering the pH of the solution to approximately 4.5 and maintaining the pH at this level while stirring for approximately 3 hours,
  (4) uniformly lowering the pH to approximately 1.5 and maintaining the pH at this level while stirring for approximately 4 hours,
(i) separating the resulting precipitate, and
(j) alkalinizing the precipitate to form the desired metallic chlorophyllins.

References Cited by the Examiner

UNITED STATES PATENTS 3,141,832   7/1964   Burdick _____ 195—66

OTHER REFERENCES

Burdick: Chemurgic Digest 12, 11 to 13, June–July 1953.

Burdick et al.: Industrial and Engineering Chemistry, vol. 46, pp. 2262–2271, November 1954.

Burdick: Chemurgic Digest 16, No. 7, pp. 4 to 6 and 12, July 1957.

A. LOUIS MONACELL, *Primary Examiner.*

L. M. SHAPIRO, *Assistant Examiner.*